United States Patent [19]
Riet

[11] 3,935,907
[45] Feb. 3, 1976

[54] COUPLING ASSEMBLY FOR MULTIPLE IMPLEMENTS

[75] Inventor: John C. Riet, Burlington, Canada

[73] Assignee: International Harvester Company, Chicago, Ill.

[22] Filed: June 29, 1972

[21] Appl. No.: 267,298

[52] U.S. Cl. ............... 172/314; 172/248; 172/311
[51] Int. Cl.² ................................................ A01B 49/00
[58] Field of Search .......... 172/310, 311, 248, 328, 172/314, 255; 280/412, 413, 414

[56] References Cited
UNITED STATES PATENTS

| | | | |
|---|---|---|---|
| 2,136,550 | 11/1938 | Howard | 172/314 X |
| 2,469,622 | 5/1949 | Acton | 172/255 |
| 2,971,774 | 2/1961 | Bartel | 172/248 X |
| 3,064,996 | 11/1962 | Roppel | 172/311 X |
| 3,334,916 | 8/1967 | Tibbals | 172/310 X |
| 3,515,223 | 6/1970 | Youngberg et al. | 172/310 X |
| 3,544,130 | 12/1970 | Hayes | 172/311 X |

Primary Examiner—Edgar S. Burr
Assistant Examiner—B. T. Rader
Attorney, Agent, or Firm—Neal C. Johnson; Floyd B. Harman

[57] ABSTRACT

A coupling assembly for interconnecting a pair of implements such as grain drills in end-to-end relation for towing behind a tractor for field operation and in an endwise direction for transport. The grain drills are connected to a tractor by conventional duplex hitch structure. The grain drills are connected to each other by a novel coupling assembly which in field operation permits the adjacent drills to move within limits toward and away from each other to accommodate ground level variations. The coupling assembly includes a latch unit positionable to lock the coupling assembly to thus retain the drills in fixed spaced relation to facilitate endwise transport of the drills.

6 Claims, 4 Drawing Figures

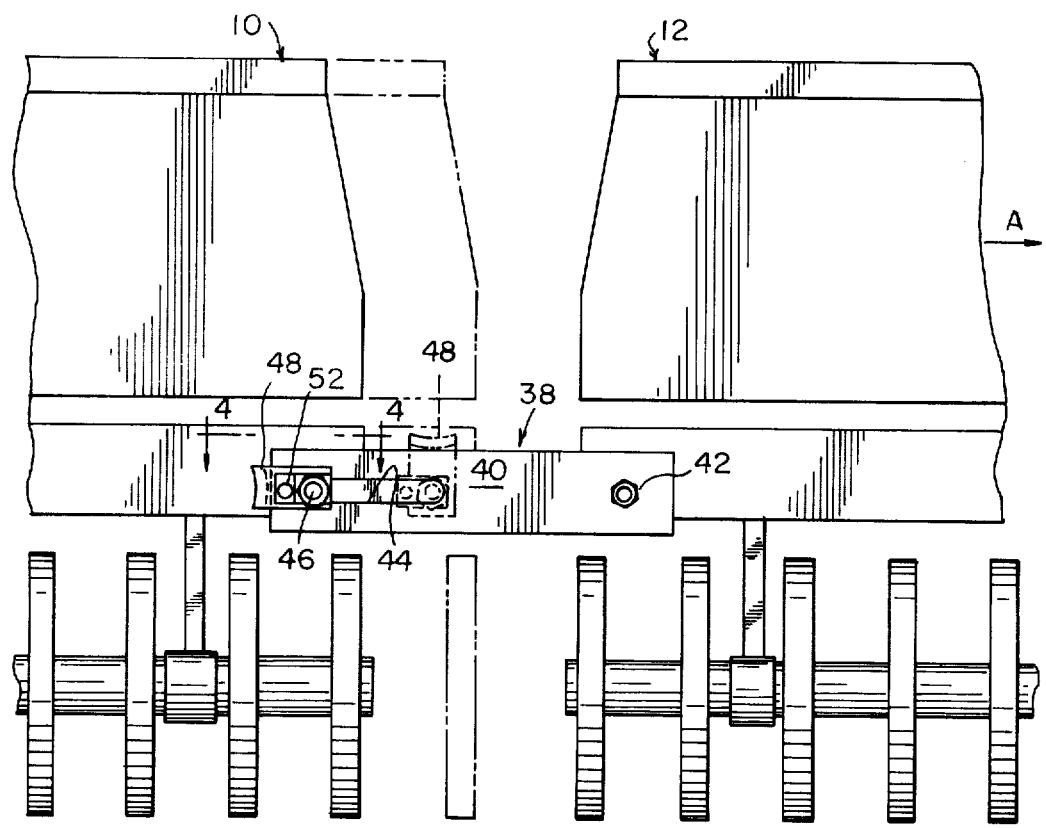
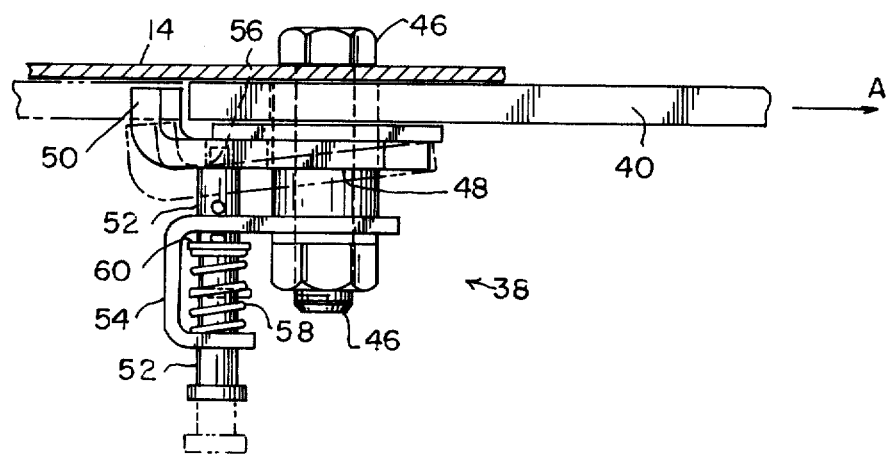

3,935,907

COUPLING ASSEMBLY FOR MULTIPLE IMPLEMENTS

CROSS REFERENCE TO RELATED APPLICATIONS

Application Ser. No. 105,191 filed Jan. 11, 1971 entitled IMPLEMENT TRANSPORT ATTACHMENT.

BACKGROUND OF THE INVENTION

1. Field of the Invention

The invention relates generally to coupling systems for multiple towed implements and more particularly to an assembly for interconnecting the implements for field operation and endwise transport.

2. Prior Art

The prior art is repleat with examples of systems for towing multiple implements in tandem relation for transport. The problem is that the minimum dimension for transport is determined by the length of the implement, which in the case of a grain drill for example may be significantly greater than the width. In such a case it would be desirable to transport the implements in the endwise direction to minimize the dimension to be accommodated through gates and along narrow roadways.

Since the ground to be worked by a system of multiple implements is never going to be perfectly level, it is necessary to interconnect the implements by means which will permit limited relative movement therebetween as the implements are towed in field operation. In other words the overall system must be flexible to accommodate uneven ground surfaces. A problem arises when it is desired to pull the implements in an endwise direction for transport. The very fact that the implements must be movably interconnected for operation causes the implements to become misaligned and track or trail improperly when towed in an endwise direction.

A further problem associated with systems for transitioning multiple implements between operative and transport modes resides in the considerable time and effort which is often required to make the conversion.

SUMMARY OF THE INVENTION

The invention relates to a coupling assembly for connecting adjacent implements in end-to-end relation for towing in both the forward direction for field operation and in an endwise direction for transport. The coupling assembly includes a latch means selectively positionable to permit limited relative movement between adjacent implements to accommodate ground level variations during operation and to prevent such movement during endwise transport.

The coupling assembly permits the multiple implements to trail or track properly during endwise transport by maintaining the implements in fixed spaced apart relation. The latch mechanism of the assembly is quickly and easily positionable so as to lock the assembly in fixed length automatically in response to pulling the implements in the endwise direction.

Briefly, the objects of the invention are to provide a coupling assembly which: interconnects adjacent implements for requisite limited relative movement during field operation; interconnects the implements for proper tracking or trailing during endwise transport; and is of relatively simple and inexpensive design and construction.

BRIEF DESCRIPTION OF THE DRAWINGS

FIG. 3 is a fragmentary elevation view taken generally in the direction of arrows 3—3 of FIG. 2 showing the implement coupling assembly of the invention; and FIG. 4 is an enlarged fragmentary sectional view of the coupling assembly taken generally in the direction of arrows 4—4 of FIG. 3.

DESCRIPTION OF THE PREFERRED EMBODIMENT

Figure 1:
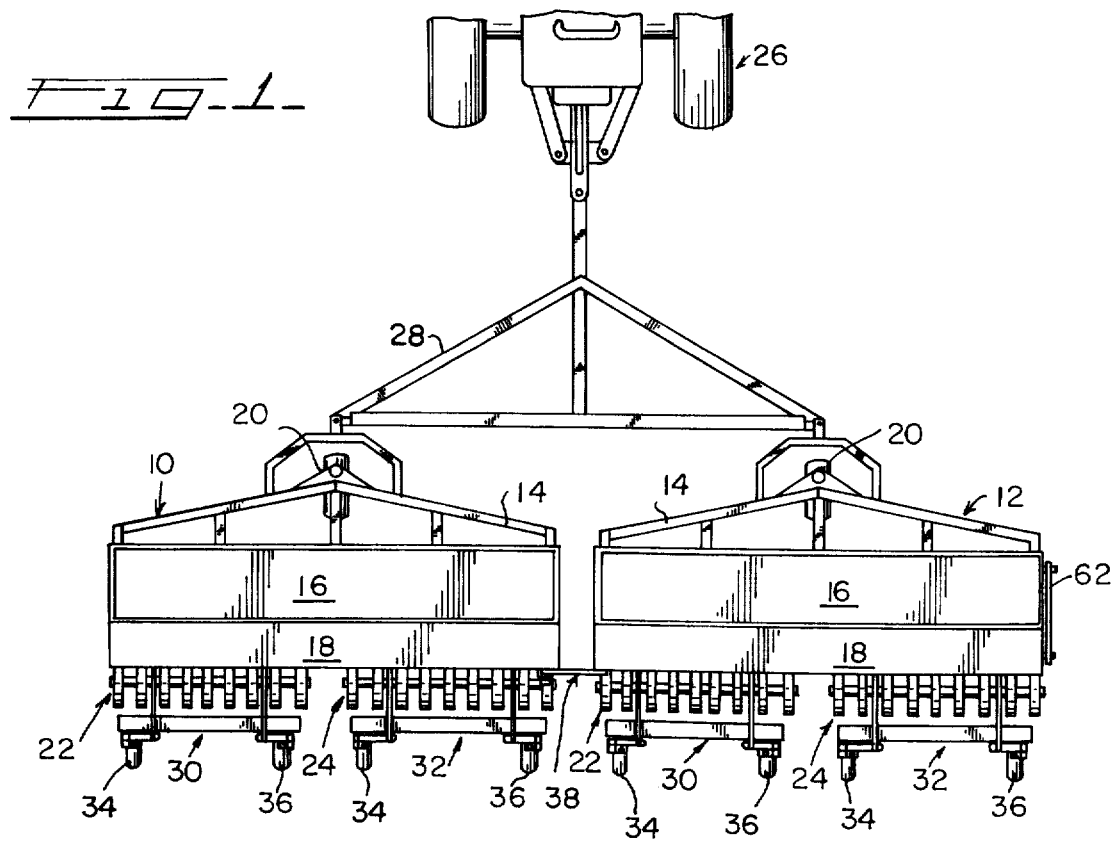
FIG. 1 is a plan view of a pair of grain drills coupled together for field operation.

Referring first to FIG. 1 there is shown a pair of conventional grain drills 10 and 12 of the so-called "press" type used for seeding crops such as grain and the like. Each of the drills 10 and 12 includes a generally horizontally disposed framework 14 which supports a relatively long and narrow hopper 16 for gravity feeding of the seeds to suitable ground-opening and planting units suspended from the framework. Such drills normally include a footboard 18 disposed along the lower edge of the hopper to provide a work platform upon which an operator may stand when filling or checking the hopper. Each of the drills is movably supported by a forwardly and centrally disposed caster wheel 20 and a pair of press wheel gangs 22 and 24.

The drills are connected for towing behind a tractor 26 by a conventional duplex hitch assembly 28 which disposes the drills in end-to-end alignment transverse to the normal forward direction of field operation as shown in FIG. 1.

Each of the drills 10 and 12 is provided with a pair of transport units 30 and 32 which may be constructed in accordance with the details of the transport units 36 and 38 shown in the above mentioned patent application. It will be understood that each of the transport units 30 and 32 includes a pair of caster wheels 34 and 36. The wheels 34 and 36 together with the front caster wheels 20 support the drills for transport when the wheels 34 and 36 are disposed in ground engaging positions.

In accordance with the invention the drills 10 and 12 are interconnected by means which provide limited movement of the drills relative to each other as required in field operation, while also selectively retaining the drills in fixed spaced apart relation for endwise transport. A coupling assembly shown generally at 38 in FIG. 1 interconnects the adjacent ends of the drills 10 and 12 at points proximate to the rear of the drills as viewed in plan and to the respective frames above the level of the press wheels as shown in FIG. 3.

The coupling assembly 38 includes an elongated strap or bar 40 pivotally mounted at one end on a bolt 42 extending rearwardly from the drill 12. An elongated slot 44 is defined through the bar 40 proximate to the opposite end thereof. A bolt 46 extends rearwardly from the drill 10 and projects through the slot 44. It will thus be seen that the drills 10 and 12 can move endwise toward and away from each other a distance limited to the length of the slot 44.

The coupling assembly 38 further includes a latch member 48 pivotally mounted on the bolt 46 outboard of the bar 40. The latch member 48 includes an integral lip portion 50 disposed laterally from an end thereof. The lip portion 50 is disposed a distance from the bolt 46 sufficient to flank the upper edge of the bar 40 when the latch 48 is disposed in the vertical position shown in dotted lines in FIG. 3. It will also be seen that the lip portion 50 projects over the end of the bar 40 when the latch 48 is pivoted to the horizontal position shown in solid lines in FIGS. 3 and 4.

The coupling assembly 38 includes means for retaining the latch member 48 in its horizontal position and in addition for biasing the member 48 toward the bar 40. A pin 52 is slidably mounted in a bracket 54 of channel shape mounted on the bolt 46 as shown in FIG. 4. A reduced-diameter end of the pin 52 projects into an opening 56 defined through the latch member 48 to thus hold the latch member in the horizontal position. A coil spring 58 is disposed over the pin 52 with one end seated against the bracket 54 and the other end against a washer 60 secured onto the pin 52. Accordingly the spring 58 is effective in compression to urge the pin 52 against the latch member 48.

In field operation (FIG. 1), traveling over irregularities in the ground surface will cause the adjacent drills to tend to move or shift toward and away from each other. With the latch member 48 disposed in the dotted line position of FIG. 3, it will be seen that the adjacent drills can shift relative to each other within the limits provided by the engagement of the bolt 46 against the respective opposite ends of the slot 44. It will of course be understood that the coupling assembly is dimensioned to prevent the drills from coming into interfering engagement and to prevent movement away from each other which would leave significant gaps between the areas being seeded by the drills.

Figure 2:
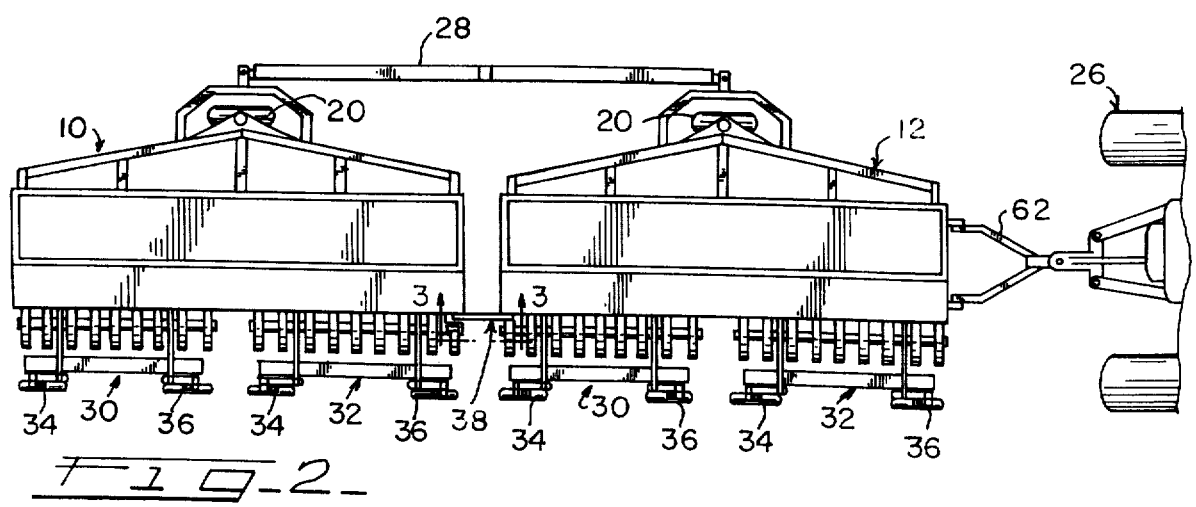
FIG. 2 is a plan view of the grain drills of FIG. 1 connected for endwise transport.

When it is desired to convert from field operation to endwise transport shown in FIG. 2, the duplex hitch 28 is uncoupled from the tractor and swung upwardly toward generally vertical position as shown in FIG. 2. The tractor is then coupled to an auxiliary hitch 62 pivotally mounted on an end of the drill 12. The wheels 34 and 36 of the transport units are lowered into their ground engaging positions. The caster wheel 20 of the now-frontmost drill 12 may be locked in its endwise direction shown in FIG. 2.

The coupling assembly 38 is easily set for endwise transport. The pin 52 is pulled outwardly so that the latch member 48 may be pivoted to its horizontally disposed position. The reduced-diameter end of the pin 52 is received in the opening 56 to retain the latch member 48 in this position. The spring 58 is effective to urge the latch member 48 against the bar 40.

As the tractor 26 is driven forwardly the drill 12 and, of course, the bar 40 are moved in the direction of arrow A in FIGS. 3 and 4. As shown in FIG. 4 the spring 58 acting on the pin 52 will move the latch member 48 from the dotted line to the solid line position in response to movement of the end of the bar 40 past the lip portion 50. In this position the bar 40 is held against movement relative to the drill 10 by virtue of the engagement of the end of the bar against the lip portion 50 and the engagement of the bolt 46 against the end of the slot 44. Accordingly the drills are retained in fixed spaced apart relation for endwise transport.

By the foregoing it will be seen that the coupling assembly of the invention provides a simple and effective means for intercoupling adjacent implements for both field operation and endwise transport.

What is claimed is:

1. A coupling assembly for connecting adjacent implements in end-to-end relation for towing, comprising:
    coupling means interconnecting the adjacent ends of adjacent implements for limited relative movement of the implements; and
    means locking said coupling means against movement in response to movement of the implements away from each other to retain the adjacent implements in fixed spaced-apart relation.

2. A coupling assembly for connecting adjacent implements in end-to-end relation for towing, comprising:
    a bar having one end secured to an end of an implement;
    connection means slidably connecting the opposite end of said bar to an adjacent end of an adjacent implement to permit longitudinal movement of the implements relative to each other; and
    latch means selectively positionable to effect locking of said connection means in response to movement of an implement longitudinally away from the adjacent implement thereby preventing further longitudinal movement of the implements relative to each other.

3. A coupling assembly for connecting adjacent implements in end-to-end relation for towing in an endwise direction for transport and a direction lateral to the endwise direction for operation, said coupling assembly comprising:
    an elongated bar coupled at one end to a first implement and extending in an endwise direction across the space between the first implement and a second implement, said bar including an elongated slot defined therethrough in an end thereof disposed adjacent to said second implement;
    a bolt secured to said second implement and projecting in the lateral direction through said slot thereby permitting endwise movement between said implements during towing in the lateral direction;
    a latch member pivotally mounted on said bolt, said latch member having a laterally extending lip portion on an end thereof, said latch member being movable to a position wherein said lip portion engages said end of said bar adjacent to said second implement to lock said bar against movement relative to said second implement whereby said implements are retained in fixed spaced relation for endwise towing.

4. The subject matter of claim 3, including means for biasing said latch member to said position.

5. The subject matter of claim 3, wherein said bar includes a pair of edges flanking said slot in parallel relation, said lip portion of said latch member being spaced from said bolt a distance sufficient to flank either of said edges to thereby permit relative movement between said implements.

6. A coupling assembly for a pair of implements coupled in end-to-end relation for towing in transport in an endwise direction and for towing in operation in a direction lateral with respect to the endwise direction, comprising:
    an elongated bar interconnecting the implements means slidably interconnecting said bar to one of said implements to facilitate towing in operation; and
    latch means selectively positionable to lock said bar against sliding movement relative to said one implement to maintain said implements in fixed spaced apart relation to facilitate towing in transport, said latch means including a latch member having a laterally disposed lip portion on an end thereof, said latch member being pivotable between a position wherein said lip portion engages an end of said bar to lock the same and a position wherein said lip portion is disposed in flanking relation to said bar to permit said sliding movement.

* * * * *